United States Patent
Fuccello et al.

(10) Patent No.: US 7,447,505 B2
(45) Date of Patent: *Nov. 4, 2008

(54) SYSTEM AND METHOD FOR COEXISTENCE IN WIRELESS NETWORKS

(75) Inventors: James R. Fuccello, Patchogue, NY (US); Anthony D'Agostino, Smithtown, NY (US); Mark Orlassino, Centereach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/852,605

(22) Filed: Sep. 10, 2007

(65) Prior Publication Data

US 2007/0298837 A1 Dec. 27, 2007

Related U.S. Application Data

(63) Continuation of application No. 10/835,784, filed on Apr. 30, 2004, now Pat. No. 7,280,836.

(51) Int. Cl.
*H04Q 7/20* (2006.01)

(52) U.S. Cl. ............... 455/452.1; 455/450; 455/455; 455/507; 455/509; 455/516; 455/502; 455/552.1; 455/41.2; 370/328; 370/329; 370/330; 370/348; 370/442; 370/468; 370/336

(58) Field of Classification Search ......... 455/418–420, 455/450–451, 452.1–2, 453–455, 73, 41.2, 455/500, 502, 507, 509, 515–516, 550.1, 455/552.1, 553.1, 561; 370/328–330, 336, 370/338, 346–350, 464, 468, 310.1–2, 400, 370/431, 442

See application file for complete search history.

(56) References Cited

U.S. PATENT DOCUMENTS

| | | | | | |
|---|---|---|---|---|---|
| 5,355,368 | A | * | 10/1994 | Dore et al. | 370/296 |
| 5,970,062 | A | * | 10/1999 | Bauchot | 370/310.2 |
| 6,141,336 | A | * | 10/2000 | Bauchot et al. | 370/348 |
| 6,285,662 | B1 | * | 9/2001 | Watanabe et al. | 370/280 |
| 6,795,418 | B2 | * | 9/2004 | Choi | 370/336 |
| 6,967,944 | B2 | * | 11/2005 | Choi | 370/348 |
| 2005/0254449 | A1 | * | 11/2005 | Halfmann et al. | 370/328 |

* cited by examiner

Primary Examiner—Tuan A Tran
(74) Attorney, Agent, or Firm—Fay Kaplun & Marcin, LLP

(57) ABSTRACT

A computing arrangement may include a first radio transceiver operating in accordance with a first communication protocol using a frequency band and a second radio transceiver operating in accordance with a second communication protocol using the frequency band. An access point operates in accordance with the first communication protocol and transmits a communication signal that has a frame including a first time interval indicative of when communications using the first communication protocol via the frequency band are permitted to the computing arrangement. The computing arrangement determines if the frame includes a second time interval, which is indicative of and is reserved for exclusive communications in accordance with the second communication protocol. If the second time interval is absent from the frame, the computing arrangement inserts the second time interval into the frame. The computing arrangement communicates with a further device only during the second time interval.

20 Claims, 2 Drawing Sheets

SYSTEM AND METHOD FOR COEXISTENCE IN WIRELESS NETWORKS

PRIORITY CLAIM

The present application is a Continuation application of U.S. patent application Ser. No. 10/835,784 filed Apr. 30, 2004 now U.S. Pat. No. 7,280,836, the entire disclosure of which is expressly incorporated herein by reference.

BACKGROUND

Conventional systems that utilize a wireless communication protocol (e.g., the IEEE 802.11 standard) may include a plurality of wireless devices which communicate with a central computer using one or more access points (APs). As defined in the 802.11 standard, these communications use the 2.4 GHz frequency band.

Conventional wireless devices may use several predefined methods of communications within the 2.4 GHz band. One method is to use a frequency hopping spread spectrum (FHSS) mechanism where data is transmitted for a certain period of time in a particular channel and, following a pseudorandom sequence, continues transmission at a different channel for the same predetermined length of time. Currently, the wireless devices operate at a frequency hopping rate of 10 hops/second. Another transmission method is to use a direct sequence spread spectrum (DSSS) mechanism where the data is transmitted in a predetermined frequency channel and is multiplied by a pseudorandom chipping sequence during transmission.

Another wireless communication protocol, which utilizes the 2.4 GHz frequency band, is Bluetooth®. Bluetooth is designed for short-range wireless communications using a low power level. Bluetooth operates using a frequency hopping spread spectrum mechanism at a rate of 1600 hops/second. Interference exists between systems utilizing the Bluetooth and 802.11 protocols since both protocols operate on the same frequency band. Therefore, a concept of coexistence has developed, in which wireless communication systems can share the same frequency band without interfering with each other. However, many conventional coexistence techniques are proprietary and manufacturer specific. In other word, these coexistence techniques work in a closed system where all components must be participating components from the same manufacturer (i.e., any third-party device cannot be used in the closed system).

SUMMARY OF THE INVENTION

A system and method according to the present invention provides for coexistence for an open system. The open system is a system where all components does not have to be participating components from the same manufacturer (i.e., any third-party device can be used in the open system). In other words, the present invention allows to expand the existing closed system to become the open system which utilizes third-party components.

The present invention seeds time values into the beacon of a wireless unit (WU). In particular, time values are seeded locally, within the WU itself, into the beacon of a terminal WU so that the beacon of the WU becomes synchronous with the beacon of the system. Once the WU is synchronized with the system, the WU is capable of generating signal necessary for local coexistence within a terminal and also across all terminal connected to an access point (AP).

One of the advantages of the present invention is that it allows the closed-system WU to operate in its native coexistence mode while communicating with a third-party access point that has no native mechanism for coexistence.

In particular, the present invention relates to a system which includes a computing arrangement and an access point. The computing arrangement may include a first radio transceiver operating in accordance with a first communication protocol using a frequency band and a second radio transceiver operating in accordance with a second communication protocol using the frequency band.

The access point operates in accordance with the first communication protocol and transmits a communication signal using the first communication protocol. The signal has a frame including a first time interval indicative of when communications using the first communication protocol via the frequency band are permitted. The first radio transceiver receives the signal and the computing arrangement determines if the frame includes a second time interval. The second time interval is indicative of when communications using the second communication protocol via the frequency band are permitted. The second interval is reserved for exclusive communication in accordance with the second communication protocol. If the second time interval is absent from the frame, the computing arrangement inserts the second time interval into the frame. The second radio transceiver communicates with a further device utilizing the second communication protocol only during the second time interval.

DETAILED DESCRIPTION

Figure 1:
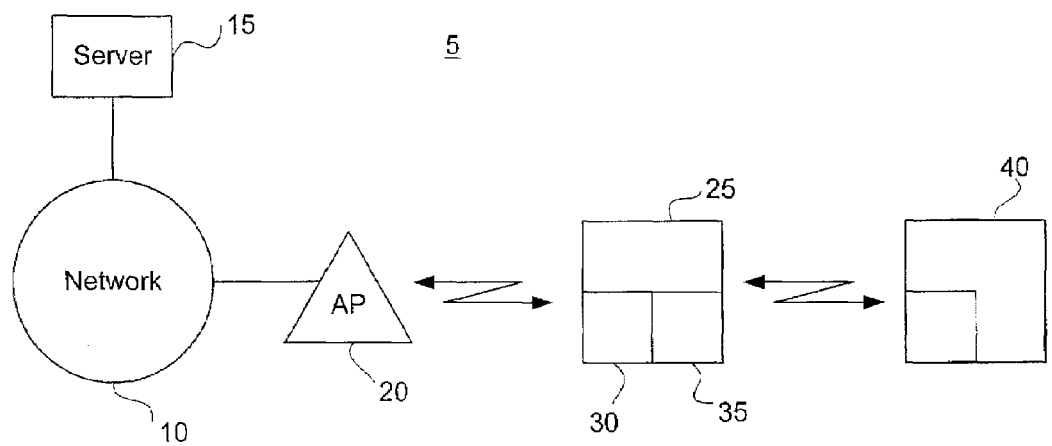
FIG. 1 shows an exemplary embodiment according to the present invention of a wireless communication network which allows its device with different communication protocols but the same frequency band.

FIG. 1 shows an exemplary embodiment of a system 5 which allows for coexistence at least two wireless communication protocols using the same frequency band. The system 5 may include a wired communication network 10 which is connected to a server 15. The communication network 10 is also connected to an access point ("AP") 20. As would be understood by those skilled in the art, there may be any number of APs, and the communication network 10 may include any number and type of components (e.g., telephones, fax machines, etc.). The connection and orientation of the communication network 10 herein described further includes the disclosure of U.S. patent application Ser. No. 09/714,803 filed Nov. 16, 2000 which is incorporated herein by reference.

The AP 20 allows for the transmission and reception of wireless signals according to a first communication protocol ("FCP") (e.g., the 802.11b protocol) using a particular frequency band (e.g., the 2.4 GHz band). As would be understood by those skilled in the art, the AP 20 may include an element (e.g., antenna) that enhances and/or facilitates the ability of the AP to send and receive the wireless signals.

The system 5 according to the present invention may further include a computing arrangement 25. As would be understood by those skilled in the art, the computing arrangement 25 may be a wireless device/unit (e.g., laptop, cell phone, PDA, hand-held computer, etc.). The computing arrangement 25 includes a first radio transceiver 30 which communicates using the FCP, allowing it to send and receive signals from the AP 20 and other wireless device utilizing the FCP. As would be understood by those skilled in the art, the first radio transceiver 30 may include an element (e.g., antenna) that enhances and/or facilitates the ability of the first radio transceiver 30 to send and receive wireless signals.

The computing arrangement 25 may further include a second radio transceiver 35 which operates in accordance with a second communication protocol ("SCP") (e.g., Bluetooth®) using the same frequency band as the FCP. For example, the second radio transceiver 35 may act as a master device (e.g., Bluetooth radio). The second radio transceiver 35 may communicate with one or more further devices 40 which operate utilizing the SCP. For example, the further device 40 may be a slave device (e.g., a scanner, a printer, a PDA, a personal data managing device, a PC card, a headset, etc.). As a slave device, the further device 40 can send and receive signals from the second radio transceiver 35 utilizing the SCP.

According to the SCP, the second radio transceiver 35 and the further device 40 in the system 5 may be authorized by a user to operate in a piconet. The second radio transceiver 35 initiates the link with the further device 40. The second radio transceiver 35 may include a clock and a frequency hopping sequence which it uses to synchronize the further device 40. Thus, the second radio transceiver 35 tells the further device 40 when it can transmit data. As will be described in greater detail below, the first radio transceiver 30 will allow for a time quantum in which the second radio transceiver and the further device 40 may operate. Therefore, according to the present invention and as shown in FIG. 1, the further device 40 may communicate using the wireless signals, and only communicates with the second radio transceiver 35.

As described above, a conventional coexistence system is proprietary and/or manufacturer specific (i.e., the closed system) and all of the equipment used in the closed system are made by the manufacturer. In the conventional closed system equipment cannot coexist with components produced by third-party manufacturers because the beacon data of the third-party device is not seeded with a synchronous SCP time quantum data (i.e., the information which defines the beacon frame 180 and the division of the beacon frame into the first time interval 190 and the second time interval 200 as described below and shown in FIG. 2). Without the synchronous SCP as that of the closed system, the coexistence design of the closed system does not permit the third-party device to either transmit or receive, thus preventing its use. For example, the closed system may present a significant disadvantage since it may not work with third-party APs, 802.11b cards, or Bluetooth radios. A lack of compatibility may significantly limit the range and effectiveness of the devices using the FCP and the SCP.

Thus, without implementing the coexistence system, there may be times when the first radio transceiver 30 and the second radio transceiver 35 attempt to operate at the same time. Since the first radio transceiver 30 and the second radio transceiver 35 may operate using the same frequency band, there is the potential for interference with one another, especially if they are housed adjacent to each other in the computing arrangement 25 or multiple nearby computing arrangements.

Figure 2:
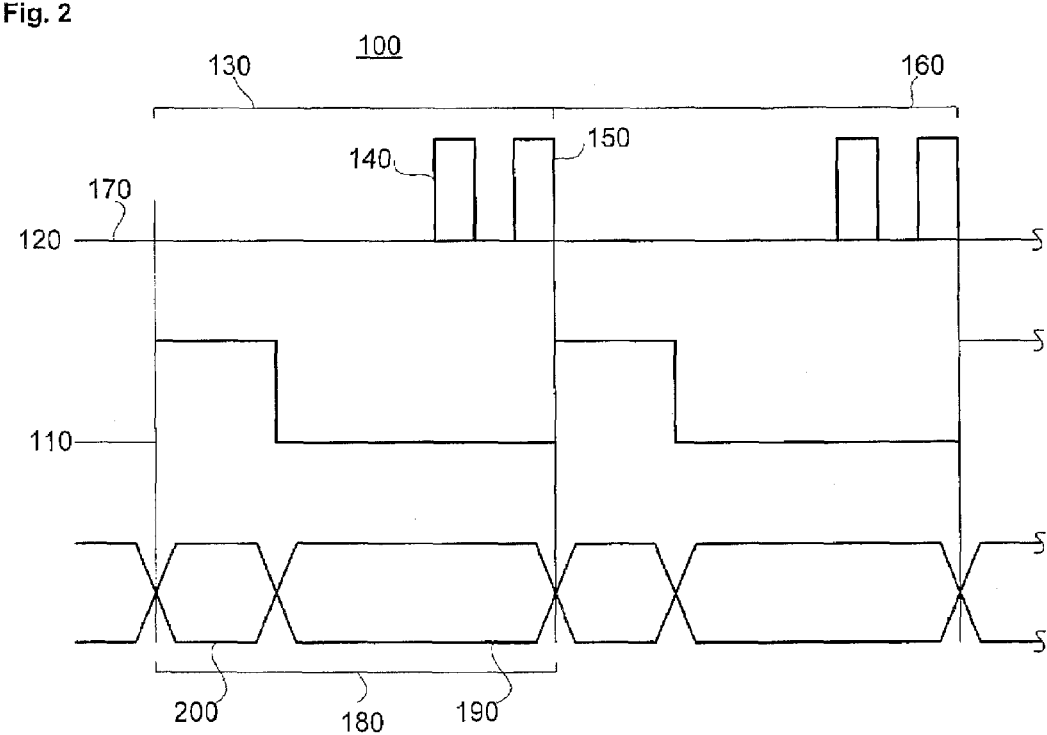
FIG. 2 shows an exemplary embodiment of a coexistence system according to the present invention.

FIG. 2 shows an exemplary embodiment of a coexistence system 100 according to the present invention. In the coexistence system 100, synchronization between the AP 20 and the first radio transceiver 30 is accomplished using a handshake signal 110. The handshake signal 110 may be generated by the first radio transceiver 30 and synced to a beacon 120 emitted from the AP 20. As would be understood by those skilled in the art, the first radio transceiver 30 may continuously scan a series of wireless channels and listen to a number of beacons to determine which AP 20 is the best with which to communicate. The association process may also be the result of information returned after the first radio transceiver 30 sends the handshake signal 110 to the AP 20.

The beacon 120 may include a beacon period 130, which further includes a pulse 140. The beacon period 130 may further include a Clear to Send (CTS) signal 150 which includes a time value that causes all other APs (including hidden stations) in the system 5 to hold off transmission of frames for a time period necessary for the requesting AP 20 to send its beacon 120. The CTS signal 150 may minimize collisions between the beacon 120 sent from the requesting AP 20 with other beacons from various APs. Preferably, each AP 20 has a beacon period 130 that is synchronous to a subsequent beacon period 160 disposed on a same backbone 170 to allow for seamless roaming within the system 5.

The beacon 120 may further include a beacon frame 180, which may be divided into a first time interval 190 and a second time interval 200. The existence of first time interval 190 and second time interval 200 allows for the coexistence of the FCP and the SCP on the same frequency band. As an example, out of a 100 msec beacon period 130, 80' of the beacon frame 180 may be exclusively dedicated to use for devices operating in accordance with the FCP (e.g., used solely for 802.11 activity of the AP 20 and the first radio transceiver 30). Thus, only 20% of the beacon frame 180 remains for the second time interval, which is exclusively dedicated to use for devices operating in accordance with the SCP (e.g., used solely for Bluetooth activity of the second radio transceiver 35 and the further device 40). These intervals 190, 200 create coexistence of devices operating according to the FCP and devices operating according to the SCP on the same frequency band.

Figure 3:
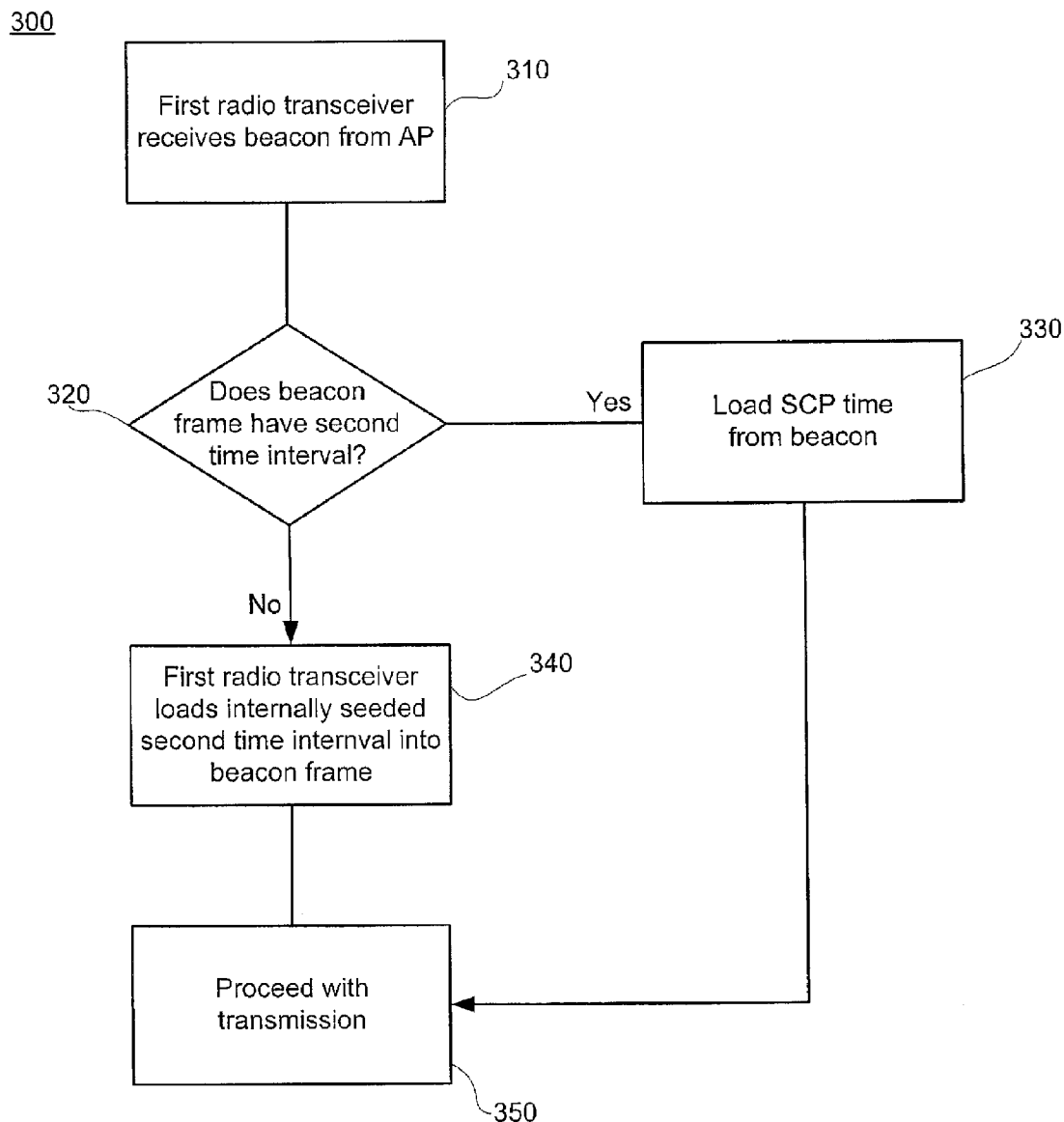
FIG. 3 shows an exemplary embodiment of a method employing the coexistence system of the present invention.

FIG. 3 shows an exemplary method 300 according to the present invention which allows a component of the closed system to communicate with third party components, thus, permitting an SCP sub-system to be utilized. In addition, a component of the closed system is able to communicate with a third-party component, thus allowing for the simultaneous coexistence of both the FCP sub-system and the SCP sub-system.

In step 310, the first radio transceiver 30 receives the beacon 120 from the AP 20. For example, the first radio transceiver 30 may be a component the closed system and the AP 20 may be a third-party component (i.e., the AP 20 is not made by the same manufacturer as the first radio transceiver 30). Reception of the beacon 120 may be in the manner as described above. The beacon 120 transmitted may include a beacon rate, which is adjustable and drives the timing for the rest of the system 5. In the present invention, the SCP time may also be transmitted as a portion of the beacon 120, replacing a formerly unused portion of the beacon data. Those of skill in the art will understand that information regarding beacons of communication protocols are contained in the standards for such protocols. In addition, the SCP timing contributes to the determination of the timing of the system 5.

At step 320, the first radio transceiver 30 examines the beacon 120 received from the AP 20. In particular, the first radio transceiver 30 determines whether the beacon 120 has a beacon frame 180 that contains the second time interval 200 which allows for communication on the frequency band exclusively for the SCP devices. If the beacon 120 includes the SEP time, the first radio transceiver 30 reads portions of the transmitted beacon data to extract the SCP time quantum data (step 330). Based on elements of the SCP time quantum data, the first radio transceiver 30 establishes a beacon frame which includes the interval 200 for the SCP transmission.

The process then continues to step 350 where the device proceeds with the transmission based on the timing included in the beacon 120 (e.g., the second transceiver 35 communicates during the interval 200 using the SCP and the first transceiver 30 communicates during the interval 190 using the FCP). As part of step 350 the first transceiver 30 may generate an arbitration signal notifying the second transceiver 35 of the time quantum (e.g., interval 200) which is available for the communication using the SCP. Thus, the FCP and the SCP coexist within the same system.

FIG. 2 shows the internal 200 as relatively smaller than the interval 190. However, based on the timing information in the beacon 120, the interval 190, 200 may be any size relative to each other. For example, there may be a beacon frame 180 that is exclusively dedicated to communication between the second radio transceiver 35 and the further device 40.

Any further beacon 120 emitted from the AP 20 may include the second time interval 200 along with the first time interval 190. Therefore, the computing arrangement 25 may communicate with the AP 20 and the further device 40 because there is time dedicated to the FCP and time dedicated to the SCP on the frequency band.

The beacon 120 received by the first radio transceiver 35 may have a beacon frame 180 that does not contain the second time interval 200, i.e., in the step 320, the first transceiver 30 determines the beacon 120 does not include the SCP time. Alternatively, the beacon 120 emitted from the AP 20 may not be received by the first radio transceiver 30 for various reasons, such as the AP 20 being made by a different manufacturer than the first radio transceiver 30.

Where the first transceiver 30 does not receive the beacon 120 with the second time interval, the second radio transceiver 35 may be able to communicate with the further device 40. However, the signals from the first transceiver 30 and the second transceiver 35 will interfere with each other and cause a general degradation in communications within system 5. The absence of the second time interval 200 does not allow for the exclusive communication for devices operating in accordance with the SCP. Thus, the second radio transceiver 35 may be completely ineffective in a sub-system defined by the AP 20 and the further device.

The process would then continue to step 340 where the beacon frame 120 has been examined by the first radio transceiver 30, and it does not contain the second time interval 200. Therefore, the second radio transceiver 35 cannot communicate with the further device 40 within the sub-system. In this situation, the second time interval 200 may be seeded locally in the first radio transceiver 30. The value designating the second time interval 200, which is to be seeded, may be obtained by the first radio transceiver 30 via the device's non-volatile registry, an application programming interface, or even a default value. Alternatively, the first radio transceiver 30 may obtain the value designating the second time interval 200 from an existing network connection, as long as interferences do not completely prevent communications from occurring.

If the second time interval 200 is locally seeded in the first radio transceiver 30, it then has the capability of collaborating with the second radio transceiver 35. In this manner, the first radio transceiver 30 receives the beacon 120 from the AP 20, wherein the beacon 120 does not contain the second time interval 200 or the AP 20 is only compatible with its manufacturer-specific devices. Thus, the SCP devices would not be operable on the frequency band. The first radio transceiver 30 then loads the second time interval 200, which is internally seeded, into the beacon frame 120. This allows for coexistence between the first radio transceiver 30 operating in accordance with the FCP and the second radio transceiver 35 operating in accordance with the SCP. Thus, after the first radio transceiver 30 has loaded the second time interval 200 into the beacon frame 120, the sub-system can proceed to operate according to the coexistence scheme described above with reference to FIG. 2.

Once the second time interval 200 is loaded into the beacon frame 120, the second radio transceiver 35 is capable of communicating with the further device 40 on the same frequency band as the first radio transceiver 30 without interference. The internal seeding of the second time interval 200 allows a proprietary or manufacturer-specific second radio transceiver 35 to operate in a third-party sub-system.

The present invention has been described with the reference to the AP 20, the radio transceivers 30, 35, and the communications protocols FCP, SCP. One skilled in the art would understand that the present invention may also be successfully implemented. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A method, comprising:
    receiving a beacon signal;
    determining whether the beacon signal includes a second time interval in addition to a first time interval;
    if the beacon signal is determined to include the second time interval, extracting time quantum data associated with a second communication protocol that is in addition to a first communication protocol that coexists with the second communication protocol on the same frequency band; and
    if the beacon signal is determined to not include the second time interval, loading the second time interval into the beacon signal.

2. The method of claim 1, further comprising:
    establishing a beacon frame based on the time quantum data, the beacon frame including an interval for transmission according to the second communication protocol.

3. The method of claim 1, further comprising:
    generating an arbitration signal indicative of an availability of the second time interval for transmission using the second communication protocol.

4. The method of claim 1, wherein the second time interval is smaller than the first time interval.

5. The method of claim 1, wherein the second time interval occupies 20% of the beacon signal, and the first time interval occupies 80% of the beacon signal.

6. The method of claim 1, further comprising:
    transmitting a first signal according to the first communication protocol during the first time interval; and
    transmitting a second signal according to the second communication protocol during the second time interval, wherein the first signal and the second signal are transmitted on the same frequency band.

7. The method of claim 1, wherein the loading of the second time interval is determined by a value obtained from one of a non-volatile registry and an application programming interface (API).

8. A system, comprising:
means for receiving a beacon signal;
means for determining whether the beacon signal includes a second time interval in addition to a first time interval;
means for extracting, if the beacon signal is determined to include the second time interval, time quantum data associated with a second communication protocol that is in addition to a first communication protocol that coexists with the second communication protocol on the same frequency band; and
means for loading, if the beacon signal is determined to not include the second time interval, the second time interval into the beacon signal.

9. The system of claim 8, further comprising:
means for establishing a beacon frame based on the time quantum data, the beacon frame including an interval for transmission according to the second communication protocol.

10. The system of claim 8, further comprising:
means for generating an arbitration signal indicative of an availability of the second time interval for transmission using the second communication protocol.

11. The system of claim 8, wherein the second time interval is smaller than the first time interval.

12. The system of claim 8, wherein the second time interval occupies 20% of the beacon signal, and the first time interval occupies 80% of the beacon signal.

13. The system of claim 8, further comprising:
means for transmitting a first signal according to the first communication protocol during the first time interval; and
means for transmitting a second signal according to the second communication protocol during the second time interval, wherein the first signal and the second signal are transmitted on the same frequency band.

14. The system of claim 8, wherein the loading of the second time interval is determined by a value obtained from one of a non-volatile registry and an application programming interface (API).

15. A system, comprising:
means for transmitting a communication signal to a computing arrangement using a first communication protocol, the signal having a frame including a first time interval indicative of when communications using the first communication protocol via a frequency band are permitted, the computing arrangement including a first transceiving means operating in accordance with the first communication protocol in a the frequency band and a second transceiving means operating in accordance with a second communication protocol via the frequency band;
means for determining in the computing arrangement if the frame includes a second time interval, the second time interval being indicative of when communications using the second communication protocol via the frequency band are permitted, the second time interval being reserved for exclusive communication in accordance with the second communication protocol; and
means for inserting, if the second time interval is absent from the frame, the second time interval into the frame,
wherein the second transceiving means communicates with a further device utilizing the second communication protocol only during the second time interval.

16. The system according to claim 15, wherein the first communication protocol is an IEEE 802.11 protocol, the second communication protocol is a Bluetooth protocol and the frequency band is a 2.4 Ghz frequency band.

17. The system according to claim 15, wherein the means for transmitting includes an access point.

18. The system according to claim 17, wherein at least one of the further device, the access point and the computing arrangement is manufactured by a first manufacturer and the at least one other of the further device, the access point and the computing arrangement is manufactured by a second manufacturer.

19. The system according to claim 15, further comprising:
means for refraining from communications by the second transceiving means and the further device utilizing the second communication protocol during the first time interval.

20. The system according to claim 15, wherein a transceiving means of the further device is manufactured by a first manufacturer, the second transceiving means of the computing arrangement being manufactured by a second manufacturer.

* * * * *